United States Patent
Cho et al.

(10) Patent No.: US 7,636,213 B2
(45) Date of Patent: Dec. 22, 2009

(54) RECORDING CURRENT OPTIMIZATION METHOD OF HARD DISK DRIVE, RECORDING MEDIUM STORING PROGRAM TO EXECUTE THE METHOD AND APPARATUS EMPLOYING THE SAME

(75) Inventors: Sung-youn Cho, Suwon-si (KR); Kyung-ho Hong, Osan-si (KR)

(73) Assignee: Samsung Electronics Co., Ltd, Suwon-si (KR)

(*) Notice: Subject to any disclaimer, the term of this patent is extended or adjusted under 35 U.S.C. 154(b) by 411 days.

(21) Appl. No.: 11/560,994

(22) Filed: Nov. 17, 2006

(65) Prior Publication Data

US 2007/0115575 A1      May 24, 2007

(30) Foreign Application Priority Data

Nov. 18, 2005 (KR) ............... 10-2005-0110887

(51) Int. Cl.
  *G11B 5/09* (2006.01)
(52) U.S. Cl. ........................................ 360/46
(58) Field of Classification Search ............. 360/66, 360/46, 53, 67, 31, 75, 25, 77.02, 68; 340/663; 324/248; 327/563; 365/207
See application file for complete search history.

(56) References Cited

U.S. PATENT DOCUMENTS

| | | | | |
|---|---|---|---|---|
| 4,720,754 A | * | 1/1988 | Mizoshita et al. | 360/77.02 |
| 5,412,518 A | * | 5/1995 | Christner et al. | 360/66 |
| 5,426,542 A | * | 6/1995 | Smith | 360/67 |
| 5,444,579 A | * | 8/1995 | Klein et al. | 360/67 |
| 5,862,238 A | * | 1/1999 | Agnew et al. | 381/321 |
| 6,054,901 A | * | 4/2000 | Nainar et al. | 330/292 |
| 6,115,201 A | * | 9/2000 | Enarson et al. | 360/66 |
| 6,150,876 A | * | 11/2000 | Ngo | 327/563 |

(Continued)

FOREIGN PATENT DOCUMENTS

JP        62-12974       1/1987

(Continued)

OTHER PUBLICATIONS

Korean Office Action dated Nov. 13, 2006 issued in KR 2005-110887.

*Primary Examiner*—Fred Tzeng
(74) *Attorney, Agent, or Firm*—Stanzione & Kim, LLP

(57) ABSTRACT

A recording current optimization method to optimize a recording current according to a change of a driving voltage applied to a pre-amplifier that generates the recording current supplied to a head, a recording medium storing a program that executes the method, and an apparatus that employs the method. The method of optimizing the recording current provided to the recording head of the hard disk drive includes detecting a driving voltage of the pre-amplifier, determining a voltage difference between the detected driving voltage and a reference driving voltage of the pre-amplifier, and optimizing the recording current according to the determined voltage difference. The recording current is adaptively optimized according to the change of the pre-amplifier driving power to provide the recording current to the head such that adjacent track erasure (ATE) and weak write (WW) are prevented from occurring due to the change of the driving power.

32 Claims, 6 Drawing Sheets

U.S. PATENT DOCUMENTS

| | | | |
|---|---|---|---|
| 6,191,989 B1 * | 2/2001 | Luk et al. | 365/207 |
| 6,226,137 B1 * | 5/2001 | Ngo | 360/46 |
| 6,275,347 B1 * | 8/2001 | Ngo et al. | 360/46 |
| 6,339,380 B1 * | 1/2002 | Wilson | 340/663 |
| 6,452,455 B2 * | 9/2002 | Manjrekar et al. | 330/292 |
| 7,453,263 B2 * | 11/2008 | Kim et al. | 324/248 |
| 2007/0070534 A1 * | 3/2007 | Aemireddy et al. | 360/25 |
| 2008/0062551 A1 * | 3/2008 | Dolan et al. | 360/31 |

FOREIGN PATENT DOCUMENTS

| | | |
|---|---|---|
| JP | 63-124204 | 5/1988 |
| KR | 10-182952 | 12/1998 |
| KR | 2004-42898 | 5/2004 |

* cited by examiner

US 7,636,213 B2

RECORDING CURRENT OPTIMIZATION METHOD OF HARD DISK DRIVE, RECORDING MEDIUM STORING PROGRAM TO EXECUTE THE METHOD AND APPARATUS EMPLOYING THE SAME

CROSS-REFERENCE TO RELATED APPLICATIONS

This application claims priority from Korean Patent Application No. 10-2005-0110887, filed on Nov. 18, 2005, in the Korean Intellectual Property Office, the disclosure of which is incorporated herein in its entirety by reference.

BACKGROUND OF THE INVENTION

1. Field of the Invention

The present general inventive concept relates to a hard disk drive, and more particularly, to a recording current optimization method that optimizes a recording current according to a change of a driving voltage applied to a pre-amplifier that generates the recording current supplied to a head, a recording medium storing a program to execute the method, and an apparatus that employs the method.

2. Description of the Related Art

A hard disk drive (HDD) is a recording device used to store information. In general, the information is recorded on concentric tracks in a surface of at least one magnetic recording disk. The disk is mounted on a spindle motor to be rotated, and the information is accessed by a reading/recording head mounted on an actuator arm rotated by a voice coil motor (VCM). The VCM is excited by current and rotates an actuator to move the head. The head senses a magnetic change generated from the disk surface to read the information recorded on the disk surface. In order to record data on the track, current is supplied to the head. The current generates a magnetic field, and the magnetic field magnetizes the disk surface.

A recording density can be increased by reducing a distance between the head and the disk. This reduces the size of the head and positions the head closer to the disk. However, as the distance between the head and the disk is reduced, adjacent tracks may be overwritten by the magnetic field generated in the head, and data recorded in the adjacent tracks may be erased as a result. This phenomenon is called adjacent track erasure (ATE). ATE becomes a critical matter when a recording current supplied to the head is large. On the other hand, weak write (WW) may occur at a low temperature due to an increase in coercivity of the disk surface.

Accordingly, a method of controlling recording parameters of a HDD (for example, a DC current or an over shoot current (OSC) of the recording current) by measuring the temperature of the HDD (by measuring the temperature of a pre-amplifier) has been used.

FIG. 1 is a waveform diagram illustrating a recording current Iw supplied to a head of an HDD. Referring to FIG. 1, a polarity of the recording current Iw is changed at a position where a value of data recorded on a disk is changed. In other words, the recording current Iw changes at the position where a direction of a magnetic field is changed, and an OSC occurs at the position where the direction of the magnetic field is changed. The position where the magnetic field is changed is represented by two arrows in the disk of FIG. 1 extending in opposite directions. A DC component of the recording current Iw retains the intensity of the magnetic field near coercivity. Coercivity, also called a coercive field, of the disk is a measure of the intensity of an applied magnetic field required to reduce the magnetization of the disk to zero after the magnetization of the disk has been driven to saturation. The OSC serves as a trigger for increasing the intensity of the magnetic field more than coercivity at the position at which the direction of the magnetic field for writing is changed.

FIG. 2 illustrates the operation of a pre-amplifier. The pre-amplifier generates the recording current having the waveform corresponding to the data to be written as illustrated in FIG. 1. The recording current generated by the pre-amplifier is applied to the head. Although a single waveform is illustrated in FIG. 1, in actuality, a pair of differential currents corresponding to the recording current Iw illustrated in FIG. 1 is applied to both ends of the head.

The pre-amplifier is a voltage source that supplies the recording current Iw to a head through a resistance(s). That is, the pre-amplifier sets the DC component and the OSC of the recording current by changing the resistance(s). The pre-amplifier includes a register to set the DC component of the recording current and a register to set the OSC of the recording current. A controller (not illustrated) controls the DC component and the OSC of the recording current by setting values of the registers.

Referring to FIG. 2, a driving voltage Vp applied to the pre-amplifier is the sum of a positive driving voltage $V_{CC}$ and a negative driving voltage $V_{EE}$. However, as described above, since the pre-amplifier serves as the voltage source, the recording current supplied to the head is changed according to a change in the driving voltage $V_P$ applied to the pre-amplifier. This means that, even when the registers of the pre-amplifier are set by the controller, the recording current is changed as the driving voltage $V_P$ of the pre-amplifier changes. A head launch voltage $V_{LAUNCH}$ is applied across a head load of the head to produce the recording current Iw flowing through the head load. The head launch voltage $V_{LAUNCH}$ across the head load is varied due to the change in the resistance(s), thereby also varying the recording current Iw flowing through the head load.

FIG. 3 is a waveform diagram illustrating a change of the OSC of the recording current Iw according to a change of the head launch voltage $V_{LAUNCH}$ of FIG. 2. In FIG. 3, reference numerals 302, 304, and 306 represent waveforms for which the head launch voltage $V_{LAUNCH}$ is 6.02 V, 6.57 V, and 7.12 V, respectively. Referring to FIG. 3, it can be seen that the OSC of the recording current Iw is changed according to the change in the head launch voltage $V_{LAUNCH}$.

FIG. 4 is a waveform diagram illustrating a change of the OSC of the recording current Iw according to the change of the driving voltage Vp of FIG. 2 applied to the pre-amplifier. In FIG. 4, reference numerals 402, 404, and 406 represent waveforms for which the driving voltage Vp is 7.32 V, 8 V, and 8.68 V, respectively. Referring to FIG. 4, it can be seen that the OSC of the recording current Iw is changed according to the change in the driving voltage Vp applied to the pre-amplifier.

FIG. 5 illustrates a change in the OSC of the recording current Iw according to a change of the DC component of the recording current Iw. Numeral 502 at the left side of FIG. 5 represents a case in which the recording current Iw is 50 mA while numeral 504 at the right side of FIG. 5 represents a case in which the DC component of the recording current Iw is 25 mA. In each case, a change in the OSC is illustrated when an OSC setting value (OSA) is varied from 0 to 15. Referring to FIG. 5, it can be seen that the OSC is changed as the DC component of the recording current Iw changes even though the OSA is identical.

A maximum value $Iw_{PEAK}$ of the recording current Iw is generated at a maximum OSA. In addition, an amplitude of the recording current Iw is determined by an available head launch voltage $V_{AVAILABLE}$, an impedance $R_{HEAD}$ of the recording head, an output impedance $R_{PA}$ of the pre-amplifier, an interconnection impedance $R_{INTERCONNECT}$, a length of a transmission line, and a reflection coefficient, but is approximated using the following equation.

$$Iw_{PEAK}] \frac{V_{AVAILABLE}}{R_{HEAD} + R_{PA} + R_{INTERCONNECT}}$$

The available head launch voltage $V_{AVAILABLE}$ is dependent on the driving voltage Vp of the pre-amplifier. For example, if a reference positive driving voltage Vccref of the pre-amplifier is 5 V and a reference negative driving voltage Veeref is −5 V, the available head launch voltage $V_{AVAILABLE1}$ is about 7 V. If a positive driving voltage Vcc of the pre-amplifier is 5.5 V and a negative driving voltage Vee is −5.5 V, the available head launch voltage $V_{AVAILABLE2}$ is about 8 V.

Accordingly, a variation $\Delta Iw_{PEAK}$ of the maximum recording current Iw according to a change of the driving voltage $V_P$ of the pre-amplifier is calculated using the following equation.

$$\Delta Iw_{PEAK} = \frac{V_{AVAILABLE2} - V_{AVAILABLE1}}{V_{AVAILABLE1}}$$
$$= \frac{8\ V - 7\ V}{7\ V} = 14.3\%$$

If the driving voltage $V_P$ of the pre-amplifier decreases, the maximum recording current $IW_{PEAK}$ is decreased and the possibility that weak write (WW) occurs is increased. In the opposite case when the driving voltage of the preamplifier increases, the possibility that ATE occurs is increased.

Accordingly, a method and an apparatus that optimizes the recording current Iw according to the change of the driving voltage $V_P$ of the pre-amplifier are needed.

SUMMARY OF THE INVENTION

The present general inventive concept provides a recording current optimization method of optimizing a recording current according to a change of a driving voltage of a pre-amplifier.

The present general inventive concept also provides a recording medium storing a program for executing the recording current optimization method.

The present general inventive concept also provides a hard disk drive (HDD) employing the recording current optimization method.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a method of optimizing a recording current provided to a recording head of a hard disk drive, the method including optimizing the recording current according to a change of a driving voltage of a pre-amplifier generating the recording current.

The foregoing and/or other aspects of the present general inventive concept are also achieved by providing a recording medium having executable code stored thereon to perform a method of optimizing a recording current provided to a recording head of a hard disk drive, the method including optimizing the recording current according to a change of a driving voltage of a pre-amplifier generating the recording current by adjusting at least one of a DC (direct current) component of the recording current and an over shoot current (OSC) of the recording current.

The foregoing and/or other aspects of the present general inventive concept are also achieved by providing a computer-readable recording medium having recorded thereon executable code to perform a method of optimizing a recording current provided to a recording head of a hard disk drive, the method including detecting a driving voltage of a pre-amplifier that generates the recording current, determining a voltage difference between the detected driving voltage and a reference driving voltage of the pre-amplifier, and optimizing the recording current according to the determined voltage difference.

The foregoing and/or other aspects of the present general inventive concept are also achieved by providing a recording medium having a program recorded thereon to perform a method of optimizing a recording current, the method including performing optimization on at least one of a DC (direct current) component of the recording current and an over shoot current (OSC) of the recording current.

The foregoing and/or other aspects of the present general inventive concept are also achieved by providing a hard disk drive, including a head to write/read information to/from a disk in response to a recording current, a pre-amplifier to generate the recording current provided to the head according to data provided from a read/write channel or to automatically control a gain of a reproducing current provided from the head to the read/write channel, a voltage detector to detect a driving voltage applied to the pre-amplifier, and a controller to optimize the recording current according to a voltage difference between the detected driving voltage of the pre-amplifier detected by the voltage detector and a reference driving voltage of the pre-amplifier.

The foregoing and/or other aspects of the present general inventive concept are also achieved by providing a hard disk drive, including at least one disk, a head to read and/or write from and/or to the at least one disk, a preamplifier to provide a current to the head such that the head operates based on the current, and a controller to adjust at least one component of the current based on a detected driving voltage of the preamplifier.

The foregoing and/or other aspects of the present general inventive concept are also achieved by providing a hard disk drive, including at least one disk, a head to read and/or write from and/or to the at least one disk, a preamplifier to provide a current to the head such that the head operates based on the current, and a controller to determine a gain with which the preamplifier amplifies data read from the at least one disk and to adjust at least one component of the current provided to the head such that the gain of the preamplifier approaches a predetermined reference gain.

The foregoing and/or other aspects of the present general inventive concept are also achieved by providing a hard disk drive, including at least one disk, a head to read and/or write from and/or to the at least one disk, a preamplifier to provide a recording current to the head such that the head operates based on the recording current, and a controller to determine a driving voltage of a preamplifier, to perform a first adjustment operation on the recording current based on the determined driving voltage of the preamplifier, to determine a gain with which the preamplifier amplifies data read from the at least one disk, and to perform a second adjustment operation on the recording current based on the determined gain of the preamplifier.

The foregoing and/or other aspects of the present general inventive concept are also achieved by providing a control apparatus of a hard disk drive having at least one disk and a head to read and/or write from and/or to the at least one disk, the apparatus including a preamplifier to provide a current to the head such that the head operates based on the current, and a controller to adjust at least one component of the current provided by the preamplifier based on a detected driving voltage of the preamplifier.

The foregoing and/or other aspects of the present general inventive concept are also achieved by providing a control apparatus of a hard disk drive having at least one disk and a head to read and/or write from and/or to the at least one disk, the apparatus including a preamplifier to provide a current to the head such that the head operates based on the current, and a controller to determine a gain with which the preamplifier amplifies data read from the at least one disk and to adjust at least one component of the current provided to the head such that the gain of the preamplifier approaches a predetermined reference gain.

The foregoing and/or other aspects of the present general inventive concept are also achieved by providing a method of optimizing a recording current in hard disk drive having at least one disk and a head to read and/or write from and/or to the at least one disk, the method including controlling a preamplifier to provide a current to the head such that the head operates based on the current, and adjusting at least one component of the current provided by the preamplifier to the head based on a detected driving voltage of the preamplifier.

The foregoing and/or other aspects of the present general inventive concept are also achieved by providing a method of optimizing current in a hard disk drive having at least one disk and a head to read and/or write from and/or to the at least one disk, the method including controlling a preamplifier to provide a recording current to the head such that the head operates based on the recording current, determining a driving voltage of the preamplifier, performing a first adjustment operation on the recording current based on the determined driving voltage of the preamplifier, determining a gain with which the preamplifier amplifies data read from the at least one disk, and performing a second adjustment operation on the recording current based on the determined gain of the preamplifier.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
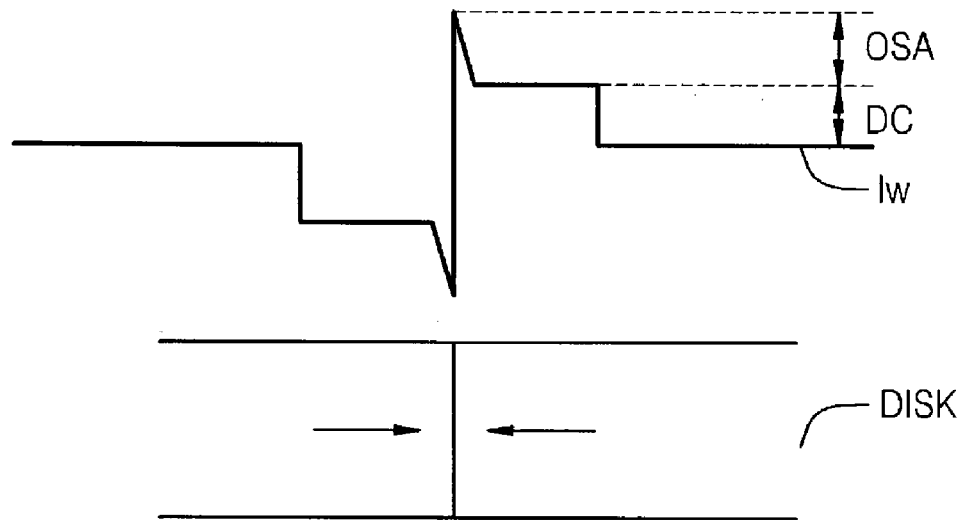
FIG. 1 is a waveform diagram illustrating a recording current supplied to a head of a hard disk drive (HDD)
Figure 2:
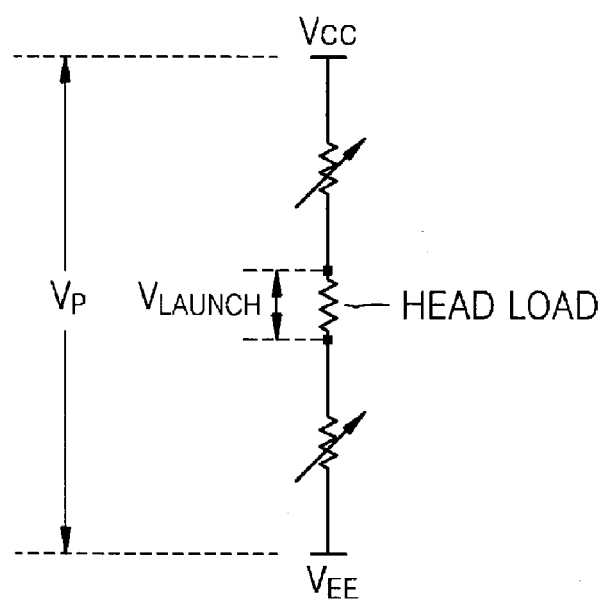
FIG. 2 illustrates operation of a pre-amplifier of the HDD.
Figure 3:
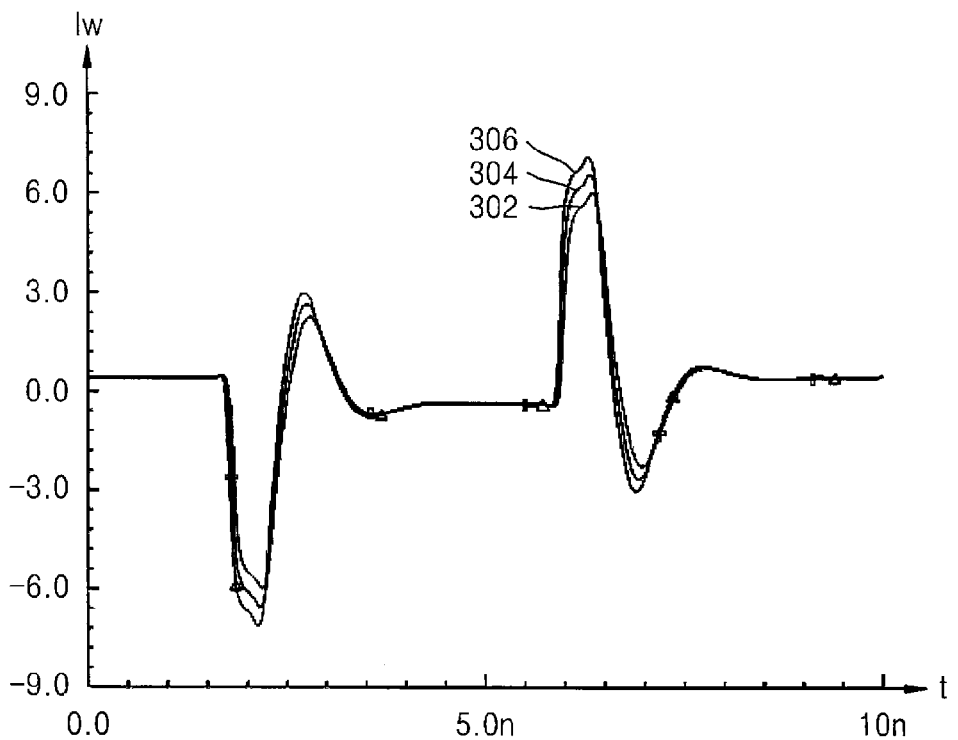
FIG. 3 is a waveform diagram illustrating a change of an over shoot current (OSC) of a recording current according to a change in a head launch voltage of the HDD.
Figure 4:
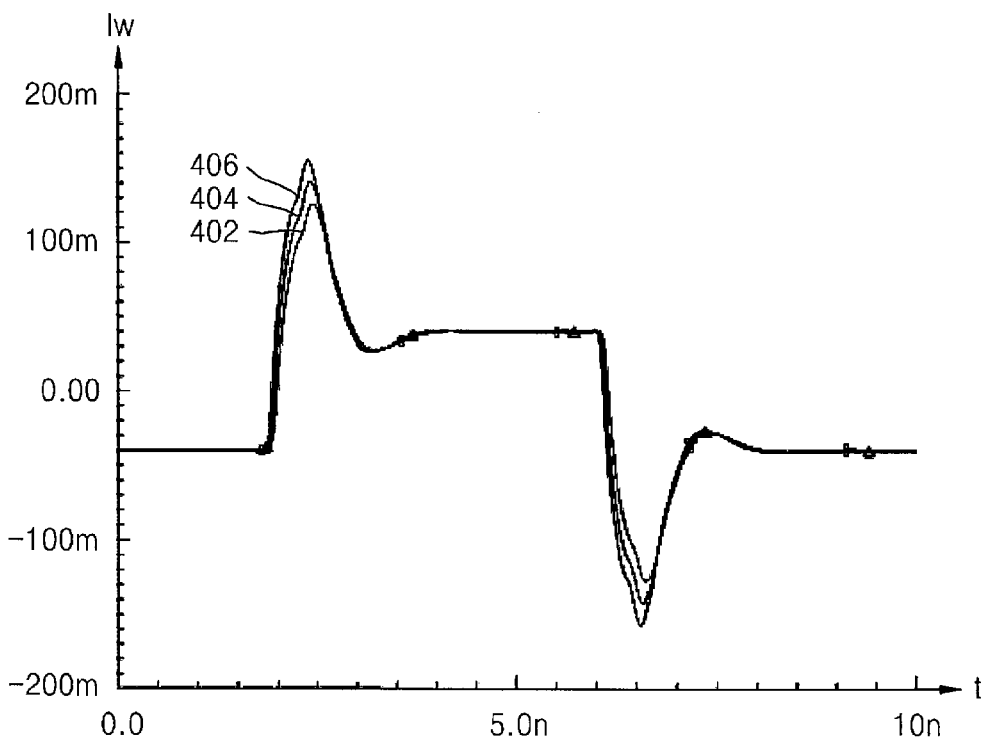
FIG. 4 is a waveform diagram illustrating a change of the OSC of the recording current according to a change in a driving voltage applied to the pre-amplifier of the HDD.
Figure 5:
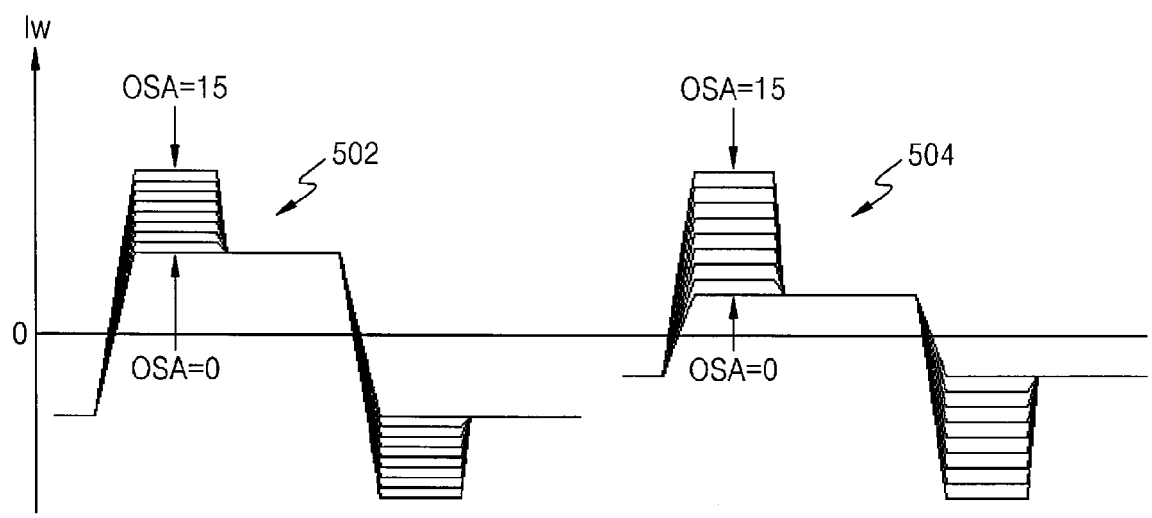
FIG. 5 illustrates a change in the OSC of the recording current according to a change of a DC component of the recording current supplied to the head of the HDD.

The present general inventive concept will now be described more fully with reference to the accompanying drawings, in which exemplary embodiments of the general inventive concept are illustrated, wherein like reference numerals refer to the like elements throughout. The embodiments are described below in order to explain the present general inventive concept by referring to the figures.

Figure 6:
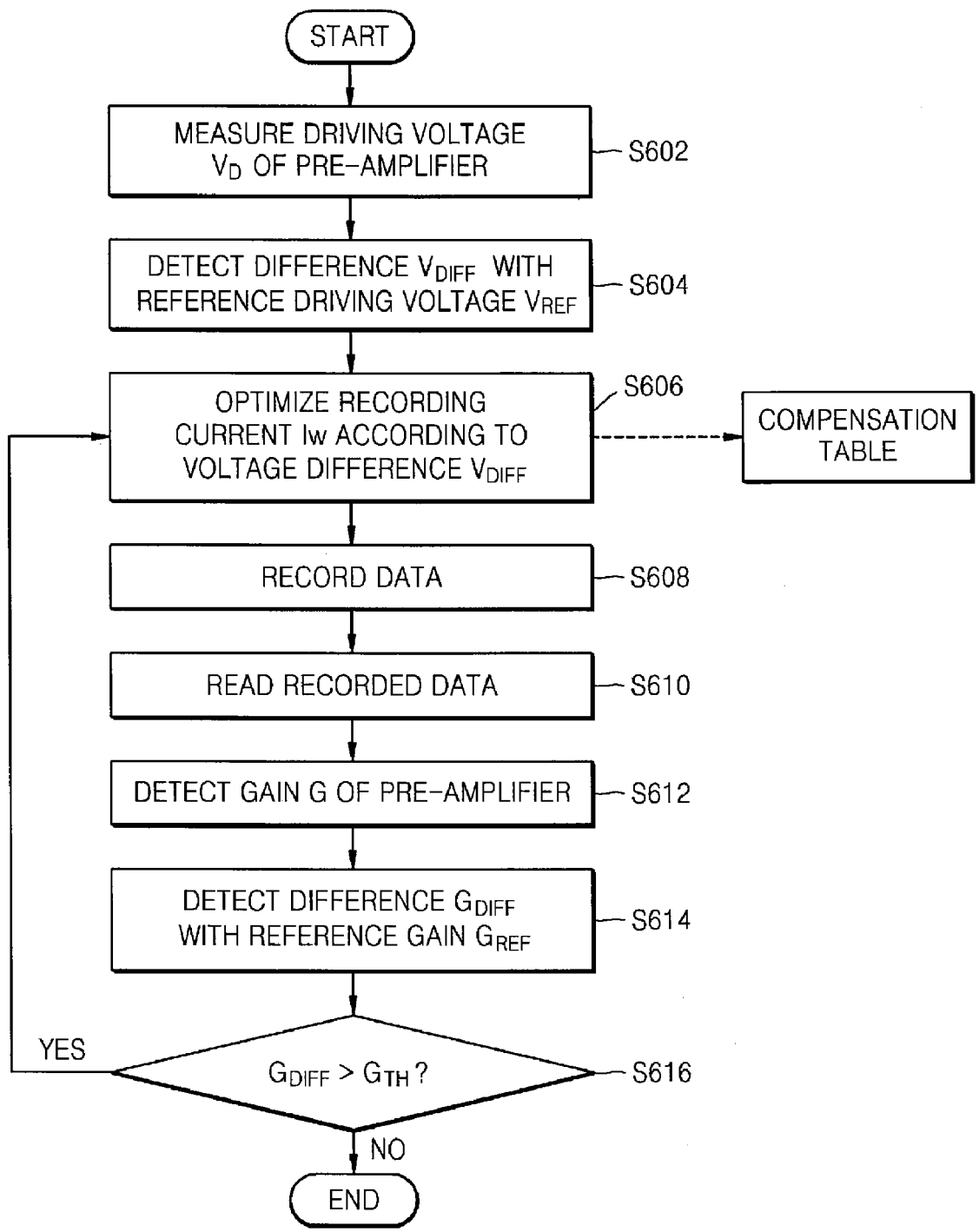
FIG. 6 is a flowchart illustrating a recording current optimization method according to an embodiment of the present general inventive concept.

FIG. 6 is a flowchart illustrating a recording current optimization method according to an embodiment of the present general inventive concept.

First, a driving voltage $V_D$ of a pre-amplifier is detected in operation S602. A controller reads the driving voltage $V_D$ of the pre-amplifier detected by a voltage detector through an analog to digital converter (ADC) (not illustrated).

A voltage difference $V_{DIFF}$ between the detected driving voltage $V_D$ and a reference driving voltage $V_{REF}$ of the pre-amplifier is calculated in operation S604.

A recording current Iw is optimized according to the calculated voltage difference $V_{DIFF}$ in operation S606.

In the operation S606, the recording current Iw is optimized by referring to a preset correction table. The correction table stores a recording current correction value corresponding to the voltage difference $V_{DIFF}$. The stored recording current correction value may include a plurality of recording current correction values that correspond to a plurality of different voltage differences. The correction table can be prepared in a burn-in test process of a hard disk drive (HDD) (not illustrated in FIG. 6). Here, the optimization is performed on a DC (direct current) component and/or an OSC (over shoot current) of the recording current Iw. In other words, the correction table may be read by a head (not illustrated in FIG. 6) and provided to a controller (not illustrated in FIG. 6) of the HDD as instructions for optimizing the recording current Iw via access to the correction table.

Data is recorded on a disk with the optimized recording current Iw in operation S608.

Recorded data is read in operation S610.

A gain G of the pre-amplifier is detected in operation S612. Here, the gain G of the pre-amplifier becomes at least one of a gain determined by an amplitude of a preamble signal recorded in a servo sector of the disk and gains determined by an amplitude of data recorded in a data sector of the disk.

A difference $G_{DIFF}$ between the detected gain G and a reference gain $G_{REF}$ is calculated in operation S614.

It is then determined whether the calculated gain difference $G_{DIFF}$ is greater than a predetermined threshold value $G_{TH}$ in operation S616.

If it is determined that the gain difference $G_{DIFF}$ is greater than the predetermined threshold value $G_{TH}$, the operation S606 is performed. In the operation S606, the recording current correction value is finely adjusted so that the gain difference $G_{DIFF}$ can be minimized.

If it is determined that the gain difference $G_{DIFF}$ is less than the predetermined threshold value $G_{TH}$ in the operation S616, the method of FIG. 6 is terminated.

The recording current optimization method according to the present embodiment, as illustrated in FIG. 6, can be performed during an initialization operation of a hard disk drive (HDD) (that is, in an initialization operation after a driving power is applied to the HDD). Alternatively, the method of FIG. 6 can be performed before a recording operation of the HDD.

Figure 7:
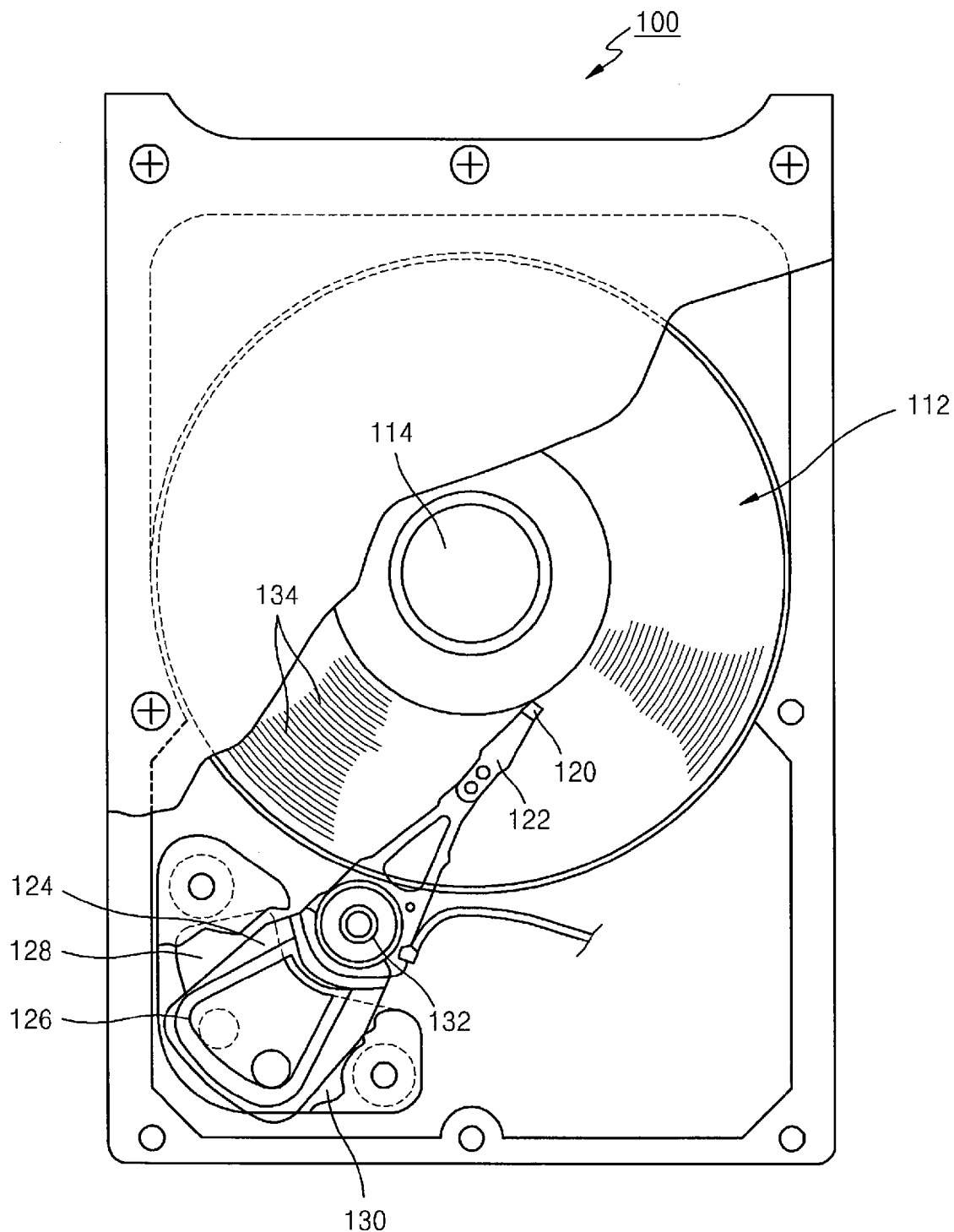
FIG. 7 is a partial cross-sectional view illustrating a structure of a hard disk drive (HDD) employing the recording current optimization method of FIG. 6 according to an embodiment of the present general inventive concept.

FIG. 7 is a partial cross-sectional view illustrating a hard disk drive (HDD) 100 according to an embodiment of the present general inventive concept. The HDD 100 may employ the method of FIG. 6. The HDD 100 includes at least one disk 112 rotated by a spindle motor 114. The HDD 100 further includes a head 116 (see FIG. 8) that is located adjacent to a surface of the disk 112.

The head 116 (see FIG. 8) can read/record information from/to the disk 112 that rotates by sensing a magnetic field formed on the surface of the disk 112 or magnetizing the surface of the disk 112. It should be understood that the head 116 (see FIG. 8) can include a recording head to magnetize the disk 112 and a separate reading head to sense the magnetic field of the disk 112.

The head 116 (see FIG. 8) can be integrated onto a slider 120, and the slider 120 is configured to generate an air bearing between the head 116 and the surface of the disk 112. The slider 120 is combined with a head stack assembly (HSA) 122. The HSA 122 is attached to an actuator arm 124 having a voice coil 126. The voice coil 126 is adjacent to a magnetic assembly 128 that specifies (supports) a voice coil motor (VCM) 130. Current supplied to the voice coil 126 generates a torque to rotate the actuator arm 124 around a bearing assembly 132. The rotation of the actuator arm 124 causes the head 116 and the slider 120 to move across the surface of the disk 112.

Information is stored on concentric tracks 134 of the disk 112. In general, the disk 112 includes a data zone in which data is recorded, a parking zone on which the head 116 is positioned when the hard disk drive 100 is not in use, and a maintenance cylinder.

Figure 8:
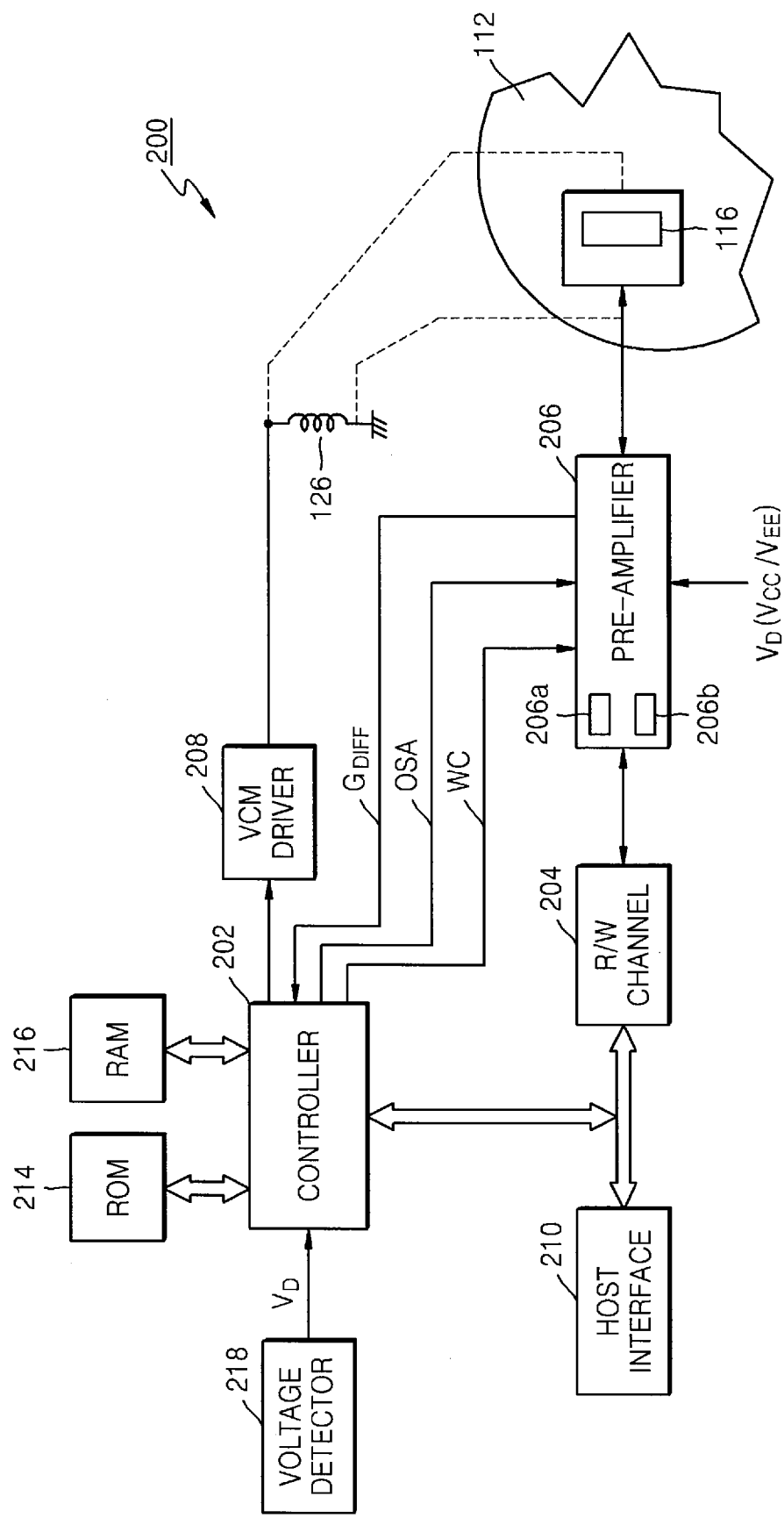
FIG. 8 is a block diagram illustrating a controlling apparatus to control a hard disk drive according to an embodiment of the present general inventive concept.

FIG. 8 is a block diagram illustrating an apparatus 200 to control the hard disk drive 100 of FIG. 7, according to an embodiment of the present general inventive concept. The apparatus 200 includes a controller 202 in communication with the head 116 through a read/write (R/W) channel 204 and a pre-amplifier 206. The controller 202 may be a digital signal processor (DSP), a microprocessor, a micro-controller, or the like.

The controller 202 supplies a control signal to the R/W channel 204 so as to read or record data from or to the disk 112.

Information is transmitted to a host interface circuit 210 from the R/W channel 204. The host interface 210 includes a control circuit (not illustrated) to interface with a host computer (not illustrated) such as a personal computer (PC).

In a read mode, the R/W channel 204 converts an analog signal which is read by the head 116 and amplified by the pre-amplifier 206 into a digital signal which can be read by the host computer (not illustrated), and outputs the digital signal to the host interface circuit 210.

On the other hand, in a recording mode, the R/W channel 204 receives write data from the host computer through the host interface circuit 210, converts the received write data into the recording current Iw so that the received write data can be recorded on the disk 112, and outputs the recording current Iw to the pre-amplifier 206.

The controller 202 is also combined with a VCM driver 208 to supply a driving current to the voice coil 126. The controller 202 supplies a control signal to the VCM driver 208 so as to control excitation of the VCM 130 (see FIG. 7), and movement of the head 116.

The controller 202 can access a read-only memory (ROM) 214 and a random access memory (RAM) 216. The memories 214 and 216 store software routines and data which can be used by the controller 202 to control the hard disk drive 100 (see FIG. 7) and/or the control apparatus 200. One of the software routines may be executable to perform the method of FIG. 6 to optimize the recording current Iw.

The pre-amplifier 206 generates the recording current Iw corresponding to the write data provided by the R/W channel 204 and provides the recording current Iw to the head 116. The pre-amplifier 206 includes a first register 206a to determine a DC (direct current) component of the recording current Iw and a second register 206b to determine an OSC (over shoot current) of the recording current Iw. Values of the first register 206a and the second register 206b are set by a DC setting value WC (write current) and an OSC setting value (OSA) provided from the controller 202.

The memory 214 stores a correction table having a recording current correction value(s) corresponding to a change(s) of a driving voltage $V_D$ of the pre-amplifier 206. A voltage detector 218 detects the driving voltage $V_D$ applied to the pre-amplifier 206. The result of the detection of the voltage detector 218 is provided to the controller 202 through an analog to digital converter (ADC) (not illustrated).

The controller 202 compares the driving voltage $V_D$ detected by the voltage detector 218 with a reference driving voltage $V_{REF}$ and calculates a voltage difference $V_{DIFF}$. The controller 202 obtains the recording current correction value corresponding to the calculated voltage difference $V_{DIFF}$ from the memory 214 and sets up a WC (write current) and the OSA to be provided to the pre-amplifier 206. Accordingly, the pre-amplifier circuit 206 can provide the optimized recording current Iw to the head 116.

In this manner, the controller 202 controls the pre-amplifier 206 and the head 116 to record the write data on the disk 112 through the R/W channel 204. Additionally, controller 202 controls the pre-amplifier 206 and the head 116 to read the recorded data from the disk 112.

A gain G (not illustrated) of the pre-amplifier 206 is obtained from the pre-amplifier 206 by reading data from the disk 112. This gain G is then provided to the controller 202.

The controller 202 compares the gain G of the pre-amplifier 206 with a reference gain $G_{REF}$ to obtain the gain difference $G_{DIFF}$. The controller 202 finely adjusts the recording current compensation value so that the gain difference $G_{DIFF}$ can be minimized.

The general inventive concept can be embodied as a method, an apparatus, or a system. When the present general inventive concept is embodied using software, elements of the present general inventive concept may be code segments that perform operations. Programs or code segments can be stored in a processor-readable medium or transmitted by a computer data signal combined with carrier waves via a transmission medium or communication network. The processor-readable medium is any data storage device that can store or transmit data which can be thereafter read by a computer system. Examples of the processor-readable medium include electronic circuits, semiconductor memory devices, read-only memory (ROM), flash memory, erasable ROM, floppy disks, optical disks, hard disks, optical fiber medium, radio frequency (RF) network, and the like. The computer data signal is any signal that can be transmitted onto an electronic network channel, optical fiber, air, an electronic field, a RF network, and the like.

As described above, in the recording current optimization method according to embodiments of the present general inventive concept, a recording current is adaptively optimized according to a change of a pre-amplifier driving power to provide the recording current to the head such that adjacent track erasure (ATE) and weak write (WW) are prevented from occurring due to the change of the driving power.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of optimizing a recording current provided to a recording head of a hard disk drive, the method comprising:
   optimizing the recording current according to a change of a driving voltage of a pre-amplifier generating the recording current,
   wherein the optimizing of the recording current comprises:
   detecting the driving voltage of the pre-amplifier;
   determining a voltage difference between the detected driving voltage and a reference driving voltage; and
   adjusting the recording current according to the determined voltage difference and a recording current compensation value.

2. The method of claim 1, wherein the adjustment of the recording current comprises adjusting the recording current in inverse proportion to the determined voltage difference.

3. The method of claim 2, wherein the adjustment of the recording current comprises adjusting the recording current by referring to a compensation table that stores the voltage difference and the recording current compensation value corresponding to the stored voltage difference.

4. The method of claim 1, wherein the optimizing of the recording current further comprises:
   recording data on a disk with the adjusted recording current;
   reading the recorded data to detect a gain of the pre-amplifier; and
   determining a gain difference between the detected gain and a reference gain of the pre-amplifier and adjusting the recording current based on the determined gain difference,
   wherein the determined gain difference is minimized by the adjustment of the recording current.

5. The method of claim 4, wherein the adjustment of the recording current comprises:
   adjusting the recording current according to the determined voltage difference by referring to a compensation table that stores the voltage difference and the recording current compensation value corresponding to the stored voltage difference; and
   finely adjusting the recording current compensation value corresponding to the stored voltage difference according to the determined gain difference.

6. The method of claim 1, wherein:
   the detecting of the driving voltage comprises detecting a positive driving voltage and a negative driving voltage;
   the determining of the voltage difference comprises determining a positive voltage difference between the detected positive driving voltage and a reference positive driving voltage and a negative voltage difference between the detected negative driving voltage and a reference negative driving voltage, respectively; and
   the adjustment of the recording current comprises adjusting the recording current according to the detected positive voltage difference and the detected negative voltage difference, respectively.

7. A recording medium having executable code stored thereon to perform a method of optimizing a recording current provided to a recording head of a hard disk drive, the method comprising:
   optimizing the recording current according to a change of a driving voltage of a pre-amplifier generating the recording current by adjusting at least one of a DC (direct current) component of the recording current and an over shoot current (OSC) of the recording current.

8. A computer-readable recording medium having recorded thereon executable code to perform a method of optimizing a recording current provided to a recording head of a hard disk drive, the method comprising:
   optimizing the recording current according to a change of a driving voltage of a pre-amplifier generating the recording current,
   wherein the optimizing of the recording current comprises:
   detecting the driving voltage of the pre-amplifier;
   determining a voltage difference between the detected driving voltage and a reference driving voltage; and
   adjusting the recording current according to the determined voltage difference and a recording current compensation value.

9. The computer-readable recording medium of claim 8, wherein the adjustment of the recording current comprises adjusting the recording current in inverse proportion to the determined voltage difference.

10. The computer-readable recording medium of claim 9, wherein the adjustment of the recording current comprises adjusting the recording current by referring to a compensation table that stores the voltage difference and a the recording current compensation value corresponding to the stored voltage difference.

11. The computer-readable recording medium of claim 8, wherein the optimizing of the recording current further comprises:
   recording data on a disk with the adjusted recording current;
   reading the recorded data to detect a gain of the pre-amplifier; and
   determining a gain difference between the detected gain and a reference gain of the pre-amplifier and adjusting the recording current based on the determined gain difference,
   wherein the determined gain difference is minimized by the adjustment of the recording current.

12. The computer-readable recording medium of claim 11, wherein the adjustment of the recording current comprises adjusting the recording current according to the determined voltage difference by referring to a compensation table that stores the voltage difference and the recording current compensation value corresponding to the stored voltage difference; and
   finely adjusting the recording current compensation value corresponding to the stored voltage difference according to the determined gain difference.

13. The computer readable medium of claim 8, wherein:
   the detecting of the driving voltage comprises detecting a positive driving voltage and a negative driving voltage;
   the determining of the voltage difference comprises determining a positive voltage difference between the detected positive driving voltage and a reference positive driving voltage and a negative voltage difference between the detected negative driving voltage and a reference negative driving voltage, respectively; and the adjustment of the recording current comprises adjusting the recording current according to the detected positive voltage difference and the detected negative voltage difference, respectively.

14. The computer-readable recording medium of claim 8, wherein the optimizing of the recording current comprises adjusting at least one of a DC component of the recording current and an over shoot current (OSO) component of the recording current.

15. A hard disk drive comprising:
a head to write/read information to/from a disk in response to a recording current;
a pre-amplifier to generate the recording current provided to the head according to data provided from a read/write channel or to automatically control a gain of a reproducing current provided from the head to the read/write channel;
a voltage detector to detect a driving voltage applied to the pro-amplifier; and
a controller to optimize the recording current according to a voltage difference between the detected driving voltage of the pro-amplifier detected by the voltage detector and a reference driving voltage of the pro-amplifier and a recording current compensation value.

16. The hard disk drive of claim 15, wherein the controller optimizes the recording current by referring to a compensation table that stores the voltage difference and the recording current compensation value corresponding to the stored voltage difference.

17. A hard disk drive, comprising:
at least one disk;
a head to read and/or write from and/or to the at least one disk;
a preamplifier to provide a current to the head such that the head operates based on the current; and
a controller to adjust at least one component of the current based on a detected driving voltage of the preamplifier, wherein the controller compares the detected driving voltage to a reference voltage to determine a voltage difference and accesses a pro-stored table to determine a current correction value corresponding to the determined voltage difference from among a plurality of current correction values corresponding to a plurality of voltage differences.

18. The hard disk drive of claim 17, wherein the controller adjusts the at least one component of the current when the hard disk drive is initialized.

19. The hard disk drive of claim 17, wherein the controller determines a gain with which the preamplifier amplifies data read from the at least one disk, compares the determined gain with a reference gain, calculates a difference between the determined gain and the reference gain, and when the calculated gain difference is less than a gain threshold, the controller finely adjusts the determined current correction value to minimize the calculated gain difference.

20. The hard disk drive of claim 17, wherein the preamplifier comprises:
a first register to store a DC component of the current provided to the head, the DC component stored in the first register being adjustable by a DC setting value write current (WC) signal provided by the controller; and
a second register to store an over shoot current of the current provided to the head, the over shoot current stored in the second register being adjustable by a OSO setting value (OSA) signal provided by the controller.

21. The hard disk drive of claim 17, wherein the adjusted at least one component of the current comprises one or more of a DC component of a recording current and an over shoot current of the recording current.

22. The hard disk drive of claim 17, wherein the at least one disk comprises:
a data zone in which data is read and recorded by the head; and
a burn in test area in which instructions for adjusting the at least one component of the current are recorded to be read by the head and provided to the controller.

23. A hard disk drive, comprising:
at least one disk;
a head to read and/or write from and/or to the at least one disk;
a preamplifier to provide a current to the head such that the head operates based on the current; and
a controller to determine a gain with which the preamplifier amplifies data read from the at least one disk and to adjust at least one component of the current provided to the head such that the gain of the preamplifier approaches a predetermined reference gain.

24. A hard disk drive, comprising:
at least one disk;
a head to read and/or write from and/or to the at least one disk;
a preamplifier to provide a recording current to the head such that the head operates based on the recording current; and
a controller to determine a driving voltage of the preamplifier, to perform a first adjustment operation on the recording current based on the determined driving voltage of the preamplifier, to determine a gain with which the preamplifier amplifies data read from the at least one disk, and to perform a second adjustment operation on the recording current based on the determined gain of the preamplifier.

25. A control apparatus of a hard disk drive having at least one disk and a head to read and/or write from and/or to the at least one disk, the apparatus comprising:
a preamplifier to provide a current to the head such that the head operates based on the current; and
a controller to determine a gain with which the preamplifier amplifies data read from the at least one disk and to adjust at least one component of the current provided to the head such that the gain of the preamplifier approaches a predetermined reference gain.

26. A method of optimizing a recording current in hard disk drive having at least one disk and a head to read and/or write from and/or to the at least one disk, the method comprising:
controlling a preamplifier to provide a current to the head such that the head operates based on the current; and
adjusting at least one component of the current provided by the preamplifier to the head based on a detected driving voltage of the preamplifier
wherein the adjustment of the at least one component of the current comprises:
comparing the detected driving voltage to a reference voltage to determine a voltage difference; and
accessing a pre-stored table to determine a current correction value corresponding to the determined voltage difference from among a plurality of current correction values corresponding to a plurality of voltage differences.

27. The method of claim 26, wherein the adjustment of the at least one component of the current is performed when the hard disk drive is initialized.

28. The method of claim 26, wherein the adjustment of the at least one component of the current further comprises:

determining a gain with which the preamplifier amplifies data read from the at least one disk;

comparing the determined gain with a reference gain;

calculating a difference between the determined gain and the reference gain; and when the calculated gain difference is less than a gain threshold, finely adjusting the determined current correction value to minimize the calculated gain difference.

29. The method of claim 26, further comprising:

storing a DC component of the current provided to the head in a first register of the preamplifier, the DC component stored in the first register being adjustable by a DC setting value write current (WC) signal transmitted to the first register; and storing an over shoot current of the current provided to the head in a second register of the preamplifier, the over shoot current stored in the second register being adjustable by a OSO setting value (OSA) signal transmitted to the second register.

30. The method of claim 26, wherein the adjustment of the at least one component of the current comprises adjusting one or more of a DC component of a recording current and an over shoot current of the recording current.

31. The method of claim 26, wherein the adjustment of the at least one component of the current comprises reading instructions for adjusting the at least one component of the current from a burn in test area on the at least one disk.

32. A method of optimizing current in a hard disk drive having at least one disk and a head to read and/or write from and/or to the at least one disk, the method comprising:

controlling a preamplifier to provide a recording current to the head such that the head operates based on the recording current;

determining a driving voltage of the preamplifier;

performing a first adjustment operation on the recording current based on the determined driving voltage of the preamplifier;

determining a gain with which the preamplifier amplifies data read from the at least one disk; and performing a second adjustment operation on the recording current based on the determined gain of the preamplifier.

* * * * *